US008842939B2

(12) United States Patent
Chien et al.

(10) Patent No.: US 8,842,939 B2
(45) Date of Patent: Sep. 23, 2014

(54) DIRECTION-ADAPTIVE IMAGE UPSAMPLING SYSTEM AND METHOD USING DOUBLE INTERPOLATION

(75) Inventors: Shao-Yi Chien, Taipei (TW); Yi-Nung Liu, Taipei (TW); Yi-Chun Lin, Taipei (TW); Ling-Hsiu Huang, Tainan City (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 337 days.

(21) Appl. No.: 13/216,055

(22) Filed: Aug. 23, 2011

(65) Prior Publication Data
US 2013/0051702 A1 Feb. 28, 2013

(51) Int. Cl.
G06K 9/32 (2006.01)
G06K 9/46 (2006.01)
G06K 9/40 (2006.01)
H04N 7/01 (2006.01)
H04N 11/20 (2006.01)
G06T 3/40 (2006.01)

(52) U.S. Cl.
CPC ............... G06T 3/4007 (2013.01); G06T 3/403 (2013.01)
USPC ........... 382/300; 382/260; 382/238; 382/266; 348/448

(58) Field of Classification Search
USPC ....................................................... 382/300
See application file for complete search history.

(56) References Cited

U.S. PATENT DOCUMENTS

| 5,347,599 | A * | 9/1994 | Yamashita et al. ............ 382/278 |
| 5,592,569 | A * | 1/1997 | Li ................. 382/253 |
| 6,072,913 | A * | 6/2000 | Yamada ........................ 382/275 |
| 7,149,364 | B2 * | 12/2006 | Umeda et al. ................. 382/260 |
| 8,355,595 | B2 * | 1/2013 | Bressan ........................ 382/274 |
| 2002/0030762 | A1 * | 3/2002 | Kishimoto .................... 348/625 |
| 2003/0202607 | A1 * | 10/2003 | Srinivasan ............... 375/240.29 |
| 2007/0172152 | A1 * | 7/2007 | Altunbasak et al. .......... 382/300 |
| 2009/0028465 | A1 * | 1/2009 | Pan .............................. 382/300 |
| 2011/0096231 | A1 * | 4/2011 | Winger et al. ................ 348/448 |

OTHER PUBLICATIONS

Double- and triple-step incremental linear interpolation Graham, P. ; Louisiana State Univ., Baton Rouge, LA, USA ; Iyengar, S.S. Computer Graphics and Applications, IEEE (vol. 14 , Issue: 3) May 1994 pp. 49-53.*

* cited by examiner

*Primary Examiner* — Michelle Entezari
(74) *Attorney, Agent, or Firm* — Stout, Uxa & Buyan, LLP; Donald E. Stout

(57) ABSTRACT

A direction-adaptive image upsampling system and method using double interpolation is disclosed. Each of double interpolation (DI) units with different interpolation functions receives an input image and generates a corresponding double-interpolated image and an associated double-interpolated difference. A decision unit receives the double-interpolated differences from the DI units for deciding the DI unit that has an optimal interpolation around a pixel under process. An adaptive selector selects the double-interpolated image associated with the DI unit having the optimal interpolation as an output image.

10 Claims, 3 Drawing Sheets

DIRECTION-ADAPTIVE IMAGE UPSAMPLING SYSTEM AND METHOD USING DOUBLE INTERPOLATION

BACKGROUND OF THE INVENTION

1. Field of the Invention

The present invention generally relates to image interpolation, and more particularly to a direction-adaptive image upsampling system and method using double interpolation.

2. Description of Related Art

Image upsampling, or image interpolation, is a process of increasing the resolution of an image. It has become an essential technique in many applications, such as image editing software, TV scaler and surveillance systems, and particularly in real-time applications.

Image upsampling may be performed either based on multiple input images or on a single input image. The former one, i.e., the multi-image upsampling, needs long computation time and is thus not suitable for real-time applications.

The latter one, i.e., the single-image upsampling, may be generally classified into three categories: the interpolation-based scheme, the statistic-based scheme and the learning-based scheme. Bilinear and bicubic are commonly used interpolation-based methods, but usually produce zigzagging artifact on the edges. Although further methods have been proposed to solve the zigzagging artifacts, time-consuming edge detection, however, is required. The statistic-based scheme employs edge statistics to reconstruct high-resolution images, but requires several iterations to arrive at a good result. The learning-based scheme predicts high-frequency details by database that requires high computation time.

For the foregoing reasons, a need has arisen to propose a novel interpolation-based scheme that has a simple and robust algorithm with high image quality suitable for real-time applications.

SUMMARY OF THE INVENTION

In view of the foregoing, it is an object of the embodiment of the present invention to provide a direction-adaptive image upsampling system and method using double interpolation such that the edge can be interpolated along the right direction without performing any time-consuming edge detection.

According to one embodiment, the direction-adaptive image upsampling system using double interpolation includes a plurality of double interpolation (DI) units with different interpolation functions, a decision unit and an adaptive selector. Each DI unit is coupled to receive an input image and generate a corresponding double-interpolated image and an associated double-interpolated difference, wherein, for each pixel and each said DI unit, the double-interpolated difference is a pixel value difference between the input image and the associated double-interpolated image. The decision unit is coupled to receive the double-interpolated differences from the plurality of DI units for deciding the DI unit that has an optimal interpolation around a pixel under process. The adaptive selector, for each pixel, is configured to select the double-interpolated image associated with the DI unit having the optimal interpolation as an output image.

DETAILED DESCRIPTION OF THE INVENTION

Figure 1:
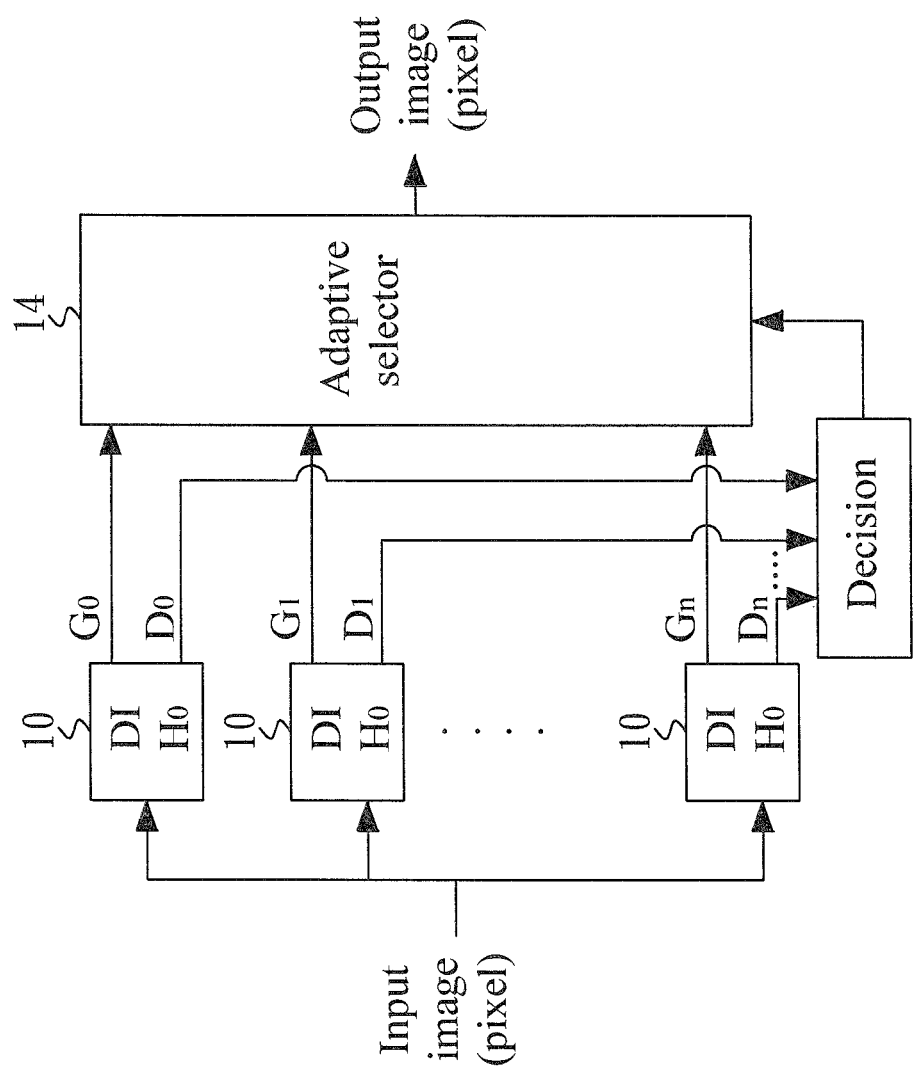
FIG. 1 shows a block diagram illustrative of a direction-adaptive image upsampling system and method using double interpolation according to one embodiment of the present invention.

FIG. 1 shows a block diagram illustrative of a direction-adaptive image upsampling system and method using double interpolation according to one embodiment of the present invention.

In the embodiment, an input image is first interpolated by several double interpolating (DI) units 10 with different interpolation functions $H_I$ (e.g., $H_0$, $H_1$, etc.). For example, a preferred embodiment adopts five interpolation functions, which includes a bicubic interpolation and four bilinear interpolations with directions of about 27°, −27°, 63° and −63°, respectively. Each DI unit 10 accordingly generates a corresponding double-interpolated image $G_I$ (e.g., $G_0$, $G_1$, etc.) and an associated double-interpolated difference $D_I$ (e.g., $D_0$, $D_1$, etc.). For each pixel, the double-interpolated difference $D_I$ is a pixel value difference between the input image and the double-interpolated image $G_I$.

Subsequently, for each pixel, a decision unit 12 is coupled to receive the double-interpolated differences $D_I$: in order to decide the DI unit 10 (or its associated interpolation function) that has an optimal interpolation around the pixel under process. In the embodiment, with respect to each DI unit 10 with the interpolation function $H_I$, a cost function $C_I$ is calculated in the decision unit 12 by summing the associated double-interpolated differences $D_I$ of the pixel (x,y) under process and its neighboring pixels:

$$C_I(x, y) = \sum_{u,v \in N} D_I(x+u, y+v)$$

where (u,v) belongs to a neighbored window N (e.g., a 7×7 (pixels) window) made of the neighboring pixels.

Among the calculated cost functions $C_I$ with respect to the interpolation functions $H_I$ of the DI units 10, the cost function $C_I$ with the least value (i.e., the minimum cost function) is determined, and the associated interpolation function $H_I$ is then determined as the interpolation function that has an optimal interpolation around the pixel under process.

Finally, for each pixel, an adaptive selector 14 is coupled to receive the double-interpolated images $G_I$ from the DI units 10, and the double-interpolated image $G_I$ corresponding to the minimum cost function $C_I$ is selected as an output image. According to the embodiment, by employing the double-interpolated difference as a quality measurement of an interpolation algorithm and locally choosing the minimum difference, the best prediction of pixel value among different interpolation algorithms can be chosen and the advantages of all the interpolation functions can be combined. That is, the edge can be interpolated along the right direction without performing any edge detection or calculating the orientation of gradient. Therefore, the embodiment can provide an artifact-free output in short computation time and can thus be suitable for real time applications.

Figure 2:
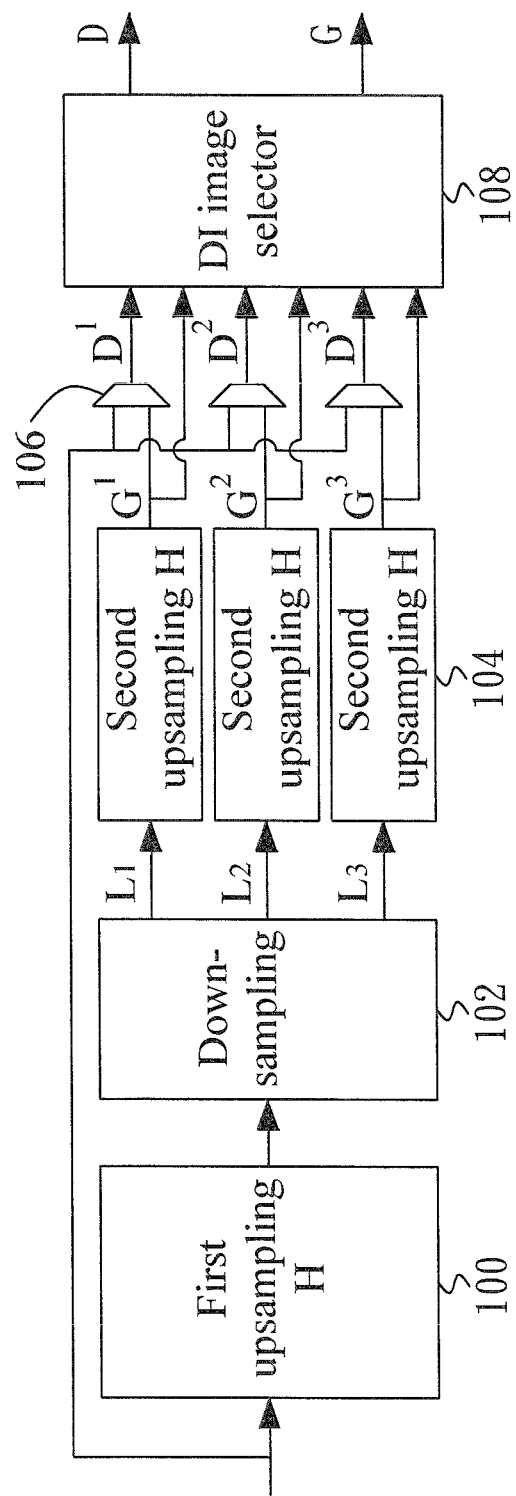
FIG. 2 shows a detailed block diagram of the DI unit of FIG. 1.
Figure 3:
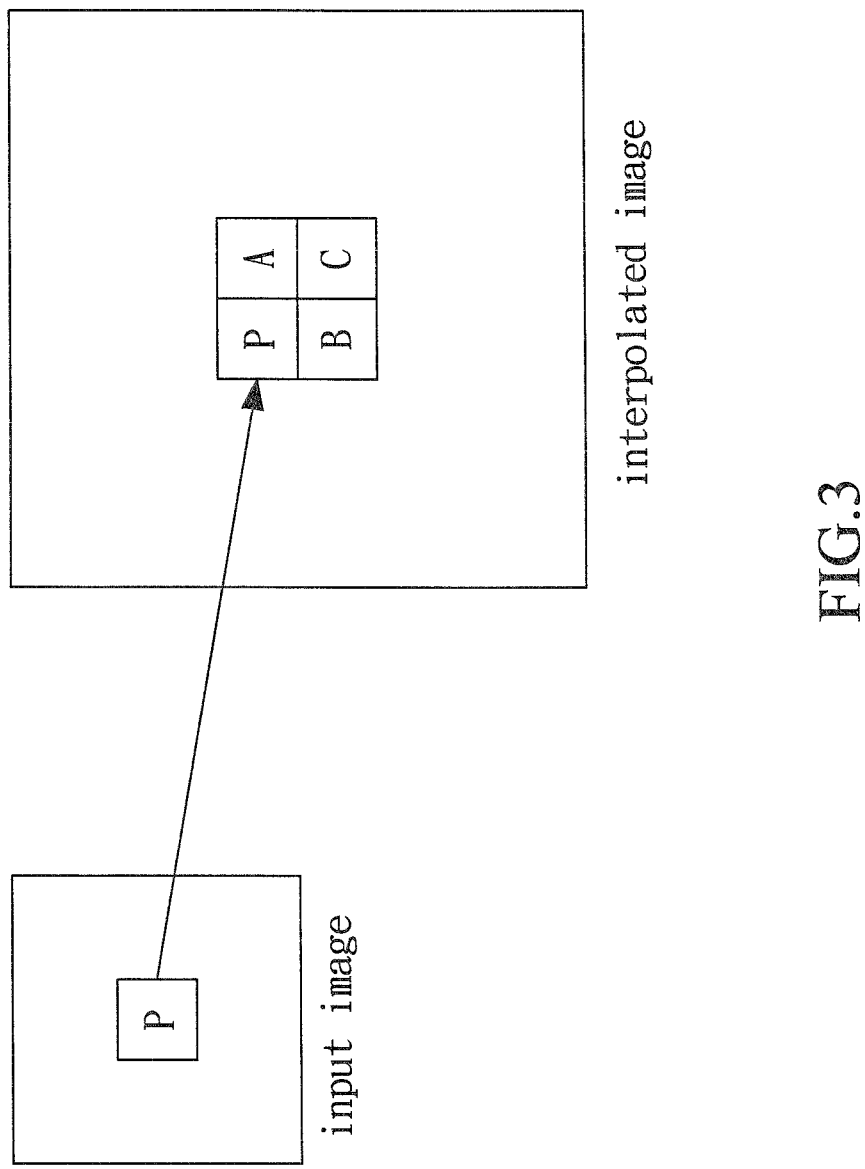
FIG. 3 shows exemplary pixels of an interpolated image with the upsampling factor of 2.

FIG. 2 shows a detailed block diagram of the DI unit 10 of FIG. 1. In the embodiment, the input image is first interpolated by a first upsampling unit 100 with an interpolation function H, therefore resulting in an interpolated image. For example, if the upsampling factor is 2, a pixel in the input image may correspond to 2×2 pixels in the interpolated image as shown in FIG. 3, where P denotes the original pixel, and A, B and C denote the interpolated pixels. The interpolated image is then down sampled (or sub-sampled) by a down-sampling unit 102, therefore resulting in several down-sampled images (e.g., $L_1$, $L_2$ and $L_3$). In the embodiment, the down-sampling of the down-sampling unit 102 is performed by pixel shifting. Regarding the example as shown in FIG. 3, the down-sampled images $L_1$, $L_2$ and $L_3$ corresponding to the pixels A, B and C may be expressed follows:

$$L_1(x,y)=H(2x+1,2y)$$

$$L_2(x,y)=H(2x,2y+1)$$

$$L_3(x,y)=H(2x+1,2y+1).$$

Afterwards, the down-sampled images are second interpolated by second upsampling units 104 with the interpolation function H, respectively, therefore resulting in double-interpolated images G (e.g., $G^1$, $G^2$ and $G^3$ corresponding to $L_1$, $L_2$ and $L_3$ respectively).

The double-interpolated images G are respectively compared with the input image by difference units 106, each of which generates an associated double-interpolated difference D (e.g., $D^1$, $D^2$ or $D^3$) that is the pixel value difference between the input image and the corresponding double-interpolated image G. Regarding the example as shown in FIG. 3, for each pixel in the input image L, the double-interpolated differences $D^1$, $D^2$ and $D^3$ corresponding to the pixels A, B and C may be expressed follows:

$$D(2x,2y)=0$$

$$D(2x+1,2y)=|L(x,y)-G^1(2x-1,2y)|$$

$$D(2x,2y+1)=|L(x,y)-G^2(2x,2y-1)|$$

$$D(2x+1,2y+1)=|L(x,y)-G^3(2x-1,2y-1)|$$

Subsequently, a double-interpolated (DI) image selector 108 is configured to select the double-interpolated image G that has the associated minimum double-interpolated difference D. Both the double-interpolated image G and its associated minimum double-interpolated difference D are thus provided, as the outputs of each DI unit 10 (FIG. 1). According to the embodiment, by means of the double-interpolated differences (within a DI unit 10), wrongly interpolated area can thus be highlighted and prevented.

Although specific embodiments have been illustrated and described, it will be appreciated by those skilled in the art that various modifications may be made without departing from the scope of the present invention, which is intended to be limited solely by the appended claims.

What is claimed is:

1. A direction-adaptive image upsampling system using double interpolation performed by a processor, the system comprising:
    a plurality of double interpolation (DI) units with different interpolation functions, said DI units being concurrently coupled to receive an input image and respectively generate corresponding double-interpolated images and associated double-interpolated differences at the same time, wherein, for each pixel and each said DI unit, the double-interpolated difference is a pixel value difference between the input image and the associated double-interpolated image;
    a decision unit coupled to receive the double-interpolated differences from the plurality of DI units at the same time for deciding the DI unit that has an optimal interpolation around a pixel under process; and
    an adaptive selector, for each pixel, configured to select the double-interpolated image associated with the DI unit having the optimal interpolation as an output image;
    wherein each said DI unit comprises the following elements that are connected in the specified order:
    a first upsampling unit with the associated interpolation function configured to first interpolate the input image, thereby resulting in an interpolated image;
    a down-sampling unit configured to down sample the interpolated image, thereby resulting in a plurality of down-sampled images;
    a plurality of second upsampling units with the same associated interpolation function configured to second interpolate the down-sampled images respectively, thereby resulting in a plurality of the double-interpolated images;
    a plurality of difference units, each of which being configured to generate the associated double-interpolated difference that is the pixel value difference between the input image and the corresponding double-interpolated image; and
    a double-interpolated image selector configured to select the double-interpolated image that has the associated double-interpolated difference having least value.

2. The system of claim 1, wherein the interpolation functions include a bicubic interpolation and four bilinear interpolations with directions of about 27°, −27°, 63° and −63°, respectively.

3. The system of claim 1, wherein the decision unit uses a cost function that is calculated by summing the associated double-interpolated differences of the pixel under process and its neighboring pixels, wherein the decision unit decides that the interpolation function associated with the cost function having least value has the optimal interpolation around the pixel under process.

4. The system of claim 3, wherein the adaptive selector selects the double-interpolated image associated with the cost function having least value as the output image.

5. The system of claim 1, wherein the interpolated image is down-sampled by pixel shifting.

6. A direction-adaptive image upsampling method using double interpolation, comprising a processor that performs the following steps:
    a plurality of double interpolation (DI) steps with different interpolation functions, said DI steps being concurrently performed by receiving an input image and respectively generating corresponding double-interpolated images and associated double-interpolated differences at the same time, wherein, for each pixel and each said DI step, the double-interpolated difference is a pixel value difference between the input image and the associated double-interpolated image;
    a decision step performed by receiving the double-interpolated differences from the plurality of DI steps at the same time for deciding the DI step that has an optimal interpolation around a pixel under process; and
    an adaptive select step, for each pixel, for selecting the double-interpolated image associated with the DI step having the optimal interpolation as an output image;
    wherein each said DI step comprises the following sub-steps that are performed in the specified order:
    a first upsampling step with the associated interpolation function for first interpolating the input image, thereby resulting in an interpolated image;
    a down-sampling step for down sampling the interpolated image, thereby resulting in a plurality of down-sampled images;

a plurality of second upsampling steps with the same associated interpolation function for second interpolating the down-sampled images respectively, thereby resulting in a plurality of the double-interpolated images;

a plurality of difference steps, each of which being performed to generate the associated double-interpolated difference that is the pixel value difference between the input image and the corresponding double-interpolated image; and a double-interpolated image select step for selecting the double-interpolated image that has the associated double-interpolated difference having least value.

7. The method of claim 6, wherein the interpolation functions include a bicubic interpolation and four bilinear interpolations with directions of about 27°, −27°, 63° and −63°, respectively.

8. The method of claim 6, wherein the decision step uses a cost function that is calculated by summing the associated double-interpolated differences of the pixel under process and its neighboring pixels, wherein the decision step decides that the interpolation function associated with the cost function having least value has the optimal interpolation around the pixel under process.

9. The method of claim 8, wherein the adaptive select step selects the double-interpolated image associated with the cost function having least value as the output image.

10. The method of claim 6, wherein the interpolated image is down-sampled by pixel shifting.

* * * * *